Aug. 2, 1927.  1,637,712

J. F. ROGERS

BLOW-OUT BOOT

Filed Aug. 9, 1926

Inventor
John F. Rogers
By F. L. Walker
Attorney

Patented Aug. 2, 1927.

1,637,712

UNITED STATES PATENT OFFICE.

JOHN F. ROGERS, OF DAYTON, OHIO; ALBERT R. ROGERS ADMINISTRATOR OF SAID JOHN F. ROGERS, DECEASED, ASSIGNOR TO LUCY A. ROGERS, OF DAYTON, OHIO.

BLOW-OUT BOOT.

Application filed August 9, 1926. Serial No. 128,031.

My invention relates to tire boots or emergency patches for pneumatic tires.

The present invention comprises a section of rubberized fabric, preferably material removed from the interior of a discarded used tire casing, which embraces the inner-tube of the tire coincident with an area of weakness or deterioration of the tire casing.

Material removed from an old discarded tire is preferred to most new material since such section of old material will be properly contoured to agree with the tire casing and the elasticity or "stretch" of the material will have been lost in use.

The boot is provided with an inner protective flap overlapping the inner-tube of the tire intermediate the margins of the boot.

Exteriorly of the boot is provided a locking flap having on its inner or under side a beveled or undercut lip for inter-locking engagement with a similar beveled or undercut lip provided upon the exterior of the boot and located at the side thereof, where it will be subjected to the pressure of the sidewall of the tire casing.

The object of invention is to simplify the structure as well as the means and mode of operation of such boots or emergency patches whereby they will not only be cheapened in construction but will be more efficient in use, capable of being easily and quickly applied, possessing secure locking engagement and unlikely to get out of order or to chafe the tire.

A further object of the invention is to provide an improved form of inter-engaging means for the locking flap. h A further object of invention is to provide means whereby the boot will be held in position when placed around the tire tube and before being placed in the tire casing and to further provide means for utilizing the pressure of the tire casing for maintaining the interlocking engagement of the boot.

With the above primary and other incidental objects in view as will more fully appear in the specification the invention consists of the features of construction the parts and combinations thereof and the mode of operation, or their equivalents, as hereinafter described and set forth in the claims.

Figure 1:
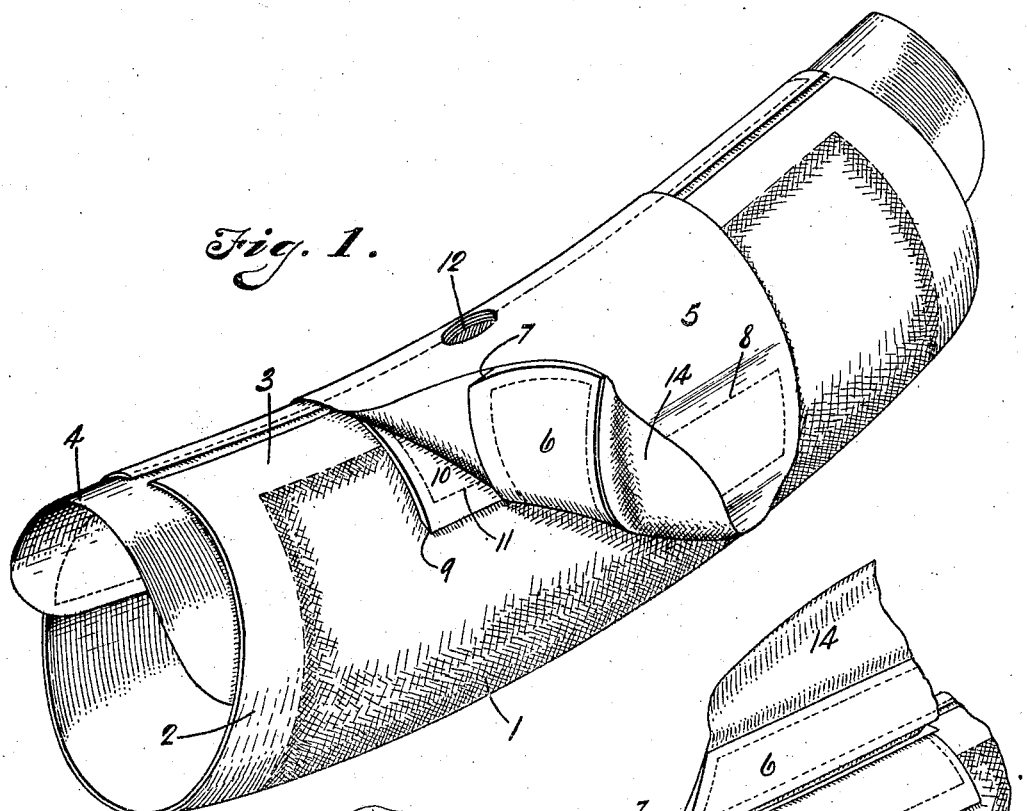
Figure 2:
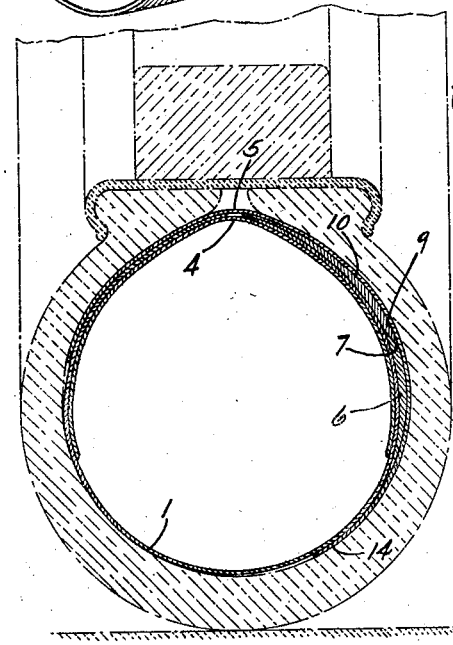
Figure 3:
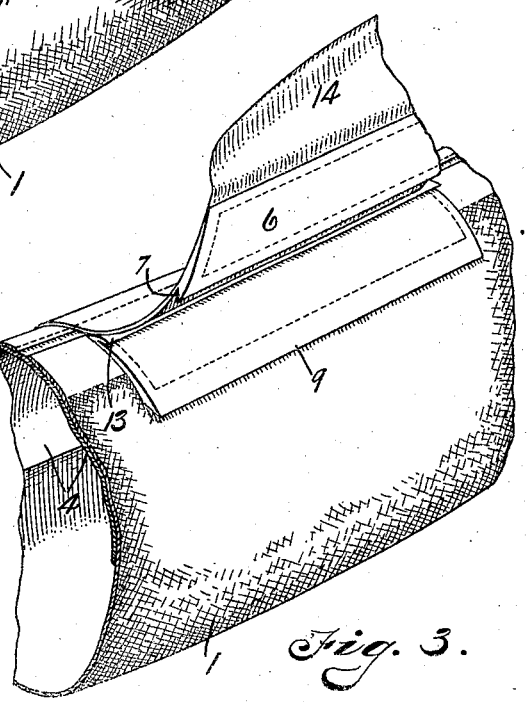

In the accompanying drawing wherein is shown the preferred but obviously not necessarily the only form of embodiment of the invention. Fig. 1 is a perspective view of the tire boot forming the subject matter hereof, disengaged from the tire. Fig. 2 is a transverse sectional view showing by dot and dash lines the relative position of the tire casing and wheel felloe. Fig. 3 is a perspective view similar to Fig. 1 showing a modification whereby the boot is adjustable for standard or oversize tires.

Like parts are indicated by similar characters of reference throughout the several views.

Referring to the accompanying drawings 1 is the tire boot or emergency patch, preferably though not necessarily formed from a section of re-enforcement fabric removed from a used tire casing. While new material may be utilized, such material before use is more or less elastic and necessitates molding or forming to the requisite shape and contour to fit the tire casing. The lining removed from an old tire casing possesses the required contour and has lost its elasticity in use. For this reason discarded tire casings afford a desirable and economical source of material supply.

The boot 1 is skived or reduced to substantially feather edge thickness not only at its ends 2—2, but also along its longitudinal margins 3. Secured interiorly to one side of the boot is a protective flap 4, which extends across the innerside of the tire tube, embraced by the boot and is overlapped by the opposite margin 3 of such boot.

The inner protective flap 4 is preferably of a soft material adapted to protect the tire tube against abrasion or chafing. Attached exteriorly to one side of the boot 1 is a locking flap 5 having on its inner surface a reversely projecting beveled or under cut lip 7. The locking flap 5 is quite flexible being preferably formed from fabric, light canvas or the like. The locking lip 7 may comprise a strip 6 of tire fabric, rubber, leather, or even flexible metal secured to the underside of the locking flap 5 in such manner as to leave its inner margin free. This locking strip 6 of which the lip comprises the inner free margin, may be secured by cementing, vulcanizing or otherwise, although in commercial production of the boot at the present time such locking strip 6 is cemented and further secured by stitching as at 8. While the inner margin or lip 7 of this strip 6 has been shown beveled, such taper or bevel although desirable is not essential. It will be found sufficient if the margin of the strip 6 is left free or detached from the locking flap 5 for engagement beneath a corresponding free or detached margin 9 of a complementary locking strip 10 secured in reverse position to the side of the boot opposite the attachment of the locking flap 5. Like the locking strip 6 the complementary strip 10 may be formed of tire fabric, rubber, leather, or flexible metal. Likewise it may be secured to the boot 1 by vulcanizing or cementing or preferably by stitching as at 11. The loose margin 9 of this locking strip 10 has been shown beveled or undercut to agree with the lip 7 of the locking strip 6 upon the flap 5. However, as in the case of the locking strip 6 such beveling of the strip 10 is not essential although desirable.

In applying the boot the main body 1 is placed about the inner tube at a point which will coincide with the weakened area of the tire casing to be reinforced. The inner flap 4 is passed smoothly over the inner tube beneath the opposite side of the boot which overlaps such protective flap 4. The locking flap 5 is then drawn across the open side of the boot and the free margin of the locking strip 6 is engaged beneath the free margin 9 of the locking strip 10. The inner surface of the locking flap 5 is preferably though not necessarily coated with an adhesive cement which causes it to adhere to the outer face of the boot 1. This adhesion of the locking flap 5 to the boot due to the cement coating enables the flap to be held smoothly upon the boot without wrinkles while being placed within the tire casing, and furthermore serves to reinforce the interlocking engagement of the flap with the boot. When placed within the tire casing, as shown in Fig. 2 the interengaged locking strips 6 and 10 are located a considerable distance from the beads of the tire casing and in position to be subjected to the pressure of the lateral wall of the tire casing.

The present construction is such that the overlapping interengaged free margins 7 and 9 of the locking strips 6 and 10 will serve to hold the boot in its adjusted position upon the inner tube before being placed in the tire casing. After being placed within the tire casing the interengaging boot lock is located beyond the bead and rim area contiguous to the side wall of the tire casing where the pressure is greatest. As will be noted particularly in Fig. 2 the locking strips 6 and 10 are preferably tapered or gradually reduced in thickness from their free overlapping margins to the opposite edges. This obviates any abrupt shoulder or bulky offset within the tire casing.

In the event that the boot is to be applied at a point coincident with the valve stem of the tire registering holes 12 may be provided in the flaps 4 and 5, through which the stem may protrude. The projection of the valve stem through holes 12 of the flaps 4 and 5 not only enables the boot to be located contiguous to the valve stem but it prevents moving or creeping of the boot within the tire casing.

To accommodate the boot to overside tires one of the locking strips may be provided with one or more additional locking lips or beads 13 as shown in Fig. 3 with which the lip or locking portion of the complementary strip may engage. It is really immaterial whether the plurality of locking lips be provided upon the strip 10 attached to the boot with either of which the lip or free margin 7 of the strip upon the flap will engage or vice versa. That is to say, the plurality of locking beads may be carried by the strip 6 upon the flap for interengagement with a single lip or free margin upon the strip 10 on the boot.

In practice it has been found that sections of corrugated rubber sheeting, such as ordinarily used for stair treads, when skived thin and attached to the contacting faces of the locking flap and side wall of the boot serve quite well the present purpose when subjected to the clamping pressure of the tire casing.

The construction described affords a blowout boot or patch having a secured lock of compact form removed from the exposed portion of the inner tube and so located as to be subjected to constant retaining pressure of the tire casing. This lock is so constructed that it will retain the boot upon the inner tube in its adjusted position wholly independent of the tire casing while the tube and boot are being placed therein. Moreover, by coating the surface 14 with an adhesive cement the possibility of wrinkles in the locking flap which might induce friction and abrasion of the casing is obviated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to the structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a blow out boot for pneumatic tires, the combination with a main reinforcement body, of a locking flap joined to one side of the main body, a lock strip secured to the under side of the flap and having a free inner margin, a complementary lock strip secured to the other side of the main body also having a free margin for overlapping interengagement with the free margin of the lock strip carried by the flap.

2. In a blow out boot for pneumatic tires, a longitudinally slit tubular section to embrace the inner tube of the tire, a lock flap secured to said section at one side of the longitudinal slit and extending thereacross for engagement with the opposite side of the section, and oppositely disposed complementary lips carried by the section and flap having overlapping interlocking engagement with each other for securing the flap in locked position.

3. In a blow out boot for pneumatic tires, a longitudinally slit tubular section to embrace the inner tube, and oppositely disposed hook like lips attached to the opposite sides of the boot and interengageable in overlapping relation to lock the boot about an inner tube.

4. In a blow out boot for pneumatic tires, a longitudinally slit body portion to embrace an inner tube, a flap joined thereto at one side of the longitudinal slit to extend thereacross, an under cut beveled shoulder upon the inner face of the flap, and a corresponding but reversely disposed under cut beveled shoulder upon the body portion said undercut beveled shoulders having overlapping locking engagement with each other to assure the flap in adjusted position.

5. In a blow out boot for pneumatic tires, a longitudinally slit body portion to embrace an inner tube, a flap joined thereto at one side of the longitudinal slit to extend thereacross, a locking member carried by the flap having a marginal portion thereof free of said flap for the insertion between such member and the flap of a like member carried by the body portion, and a like member upon the body portion having a marginal portion free of said body portion for the insertion between said member and the body portion of the free marginal portion of the member carried by the flap.

6. In a blow out boot for pneumatic tires, a longitudinally slit tubular body portion to embrace an inner tube, the ends and longitudinal margins of the body being tapered to reduce thickness, a locking flap secured to one side of the tubular body and extendible across the longitudinal slit thereof into overlapping relation with the opposite side of the body, and interlocking means upon the flap and side of the body portion engageable with each other at a point removed from the longitudinal slit of said body and in position to be subjected to the retaining pressure of the side wall of an enclosing tire casing.

7. In a blow out boot for pneumatic tires, a section of tire fabric removed from a used tire casing, a flap attached adjacent to one longitudinal margin and extendible into overlapping relation with the opposite longitudinal margin of the section when said section embraces an inner tube, and interconnecting means upon the flap and body portion held in operative engagement by the pressure of the side wall of an enclosing tire casing.

8. In a blow out boot for pneumatic tires, a body portion to embrace an inner tube, a flap joined adjacent to one longitudinal margin thereof and extending across the slit into overlapping relation with the opposite longitudinal marginal portion of the tubular body, and interengaging locking shoulders upon the flap and body portion located in spaced relation with the longitudinal slit and contiguous to the medial side area of the body portion in position to be subject to the pressure of the side wall of an enclosing tire casing.

9. In a blow out boot for pneumatic tires, a longitudinally slit tubular body portion to embrace an inner tube, a flap joined to one longitudinal margin thereof and extendible across the slit into overlapping relation with the opposite longitudinal marginal portion of the tubular body, means for interengaging the flap with the body portion in such adjusted position, said flap having therein a hole to receive the valve stem of the inner tube.

10. In a blowout boot for pneumatic tires, a longitudinally slit tubular body portion to enclose an inner tube, a locking flap on one side of the body for extension across the slit into overlapping relation with the opposite side of the body, and interengaging means between the body and flap subjected to clamping pressure of the side wall of a tire casing enclosing the inner tube and boot, when the tube is inflated, such interengaging means being located contiguous to the side wall of the casing and removed from the bead portion thereof.

11. In a blowout boot for pneumatic tires, a longitudinally slit tubular body portion to enclose an inner tube, a locking flap on one side of the body for extension across the slit into overlapping relation with the opposite side of the body, and into position to be subjected to clamping pressure of the side wall of a tire casing and interengaging beads upon the contacting faces of the locking flap and boot body, held in engagement with each other by said clamping pressure of the tire casing and inner tube.

12. In a blowout boot for pneumatic tires, a longitudinally slit tubular body portion to enclose an inner tube, a locking flap on one side of the body for extension across the slit into overlapping relation with the opposite side of the body, the overlapping portions of the flap and body being corrugated over an area contiguous to the side wall of a tire casing enclosing the boot and inner tube and removed from the bead portion of such casing and subjected to clamping pressure of the side wall of the tire casing.

In testimony whereof, I have hereunto set my hand this 4th day of August, A. D. 1926.

JOHN F. ROGERS.